United States Patent [19]

Moore

[11] 4,355,734
[45] Oct. 26, 1982

[54] SCRAPER AND SENSOR APPARATUS

[76] Inventor: Leo M. Moore, Rte. 4, Box 103, Ashland, Va. 23005

[21] Appl. No.: 210,329

[22] Filed: Nov. 25, 1980

[51] Int. Cl.³ .............................................. B67D 5/62
[52] U.S. Cl. ...................................... 222/63; 222/64; 222/146 HE; 222/334; 222/389; 219/421; 417/36; 137/341
[58] Field of Search ....................... 222/52, 59, 63, 64, 222/146 R, 146 H, 146 HE, 261, 262, 333, 334, 389, 592, 593, 258; 417/36, 41; 219/421; 137/341

[56] References Cited

U.S. PATENT DOCUMENTS

| | | | |
|---|---|---|---|
| 2,630,248 | 3/1953 | Hinz | 222/258 |
| 3,031,106 | 4/1962 | Hooker | 222/146 |
| 3,430,812 | 3/1969 | Leo et al. | 222/14 |
| 3,758,002 | 9/1973 | Kautz et al. | 222/146 R |
| 3,976,229 | 8/1976 | Jackson | 222/146 HE |
| 3,982,669 | 9/1976 | Moore | 222/146 HE |
| 4,090,640 | 5/1978 | Smith et al. | 222/52 |
| 4,195,755 | 4/1980 | Slautterback et al. | 222/146 HE |

Primary Examiner—H. Grant Skaggs
Attorney, Agent, or Firm—Witherspoon & Hargest

[57] ABSTRACT

An apparatus for dispensing material from a container comprising a plate having an aperture therein through which material is caused to flow out of the container when the plate is caused to move vertically within the container. A scraper member is spaced from and coupled to such plate to engage the inside walls of such container to scrape material from the walls as the plate moves vertically relative to the container. A space is formed between the scraper member and the plate to form a cavity which communicates with the aperture and which includes a material entering opening, the level of material in the cavity being controlled during operation of the apparatus.

22 Claims, 4 Drawing Figures

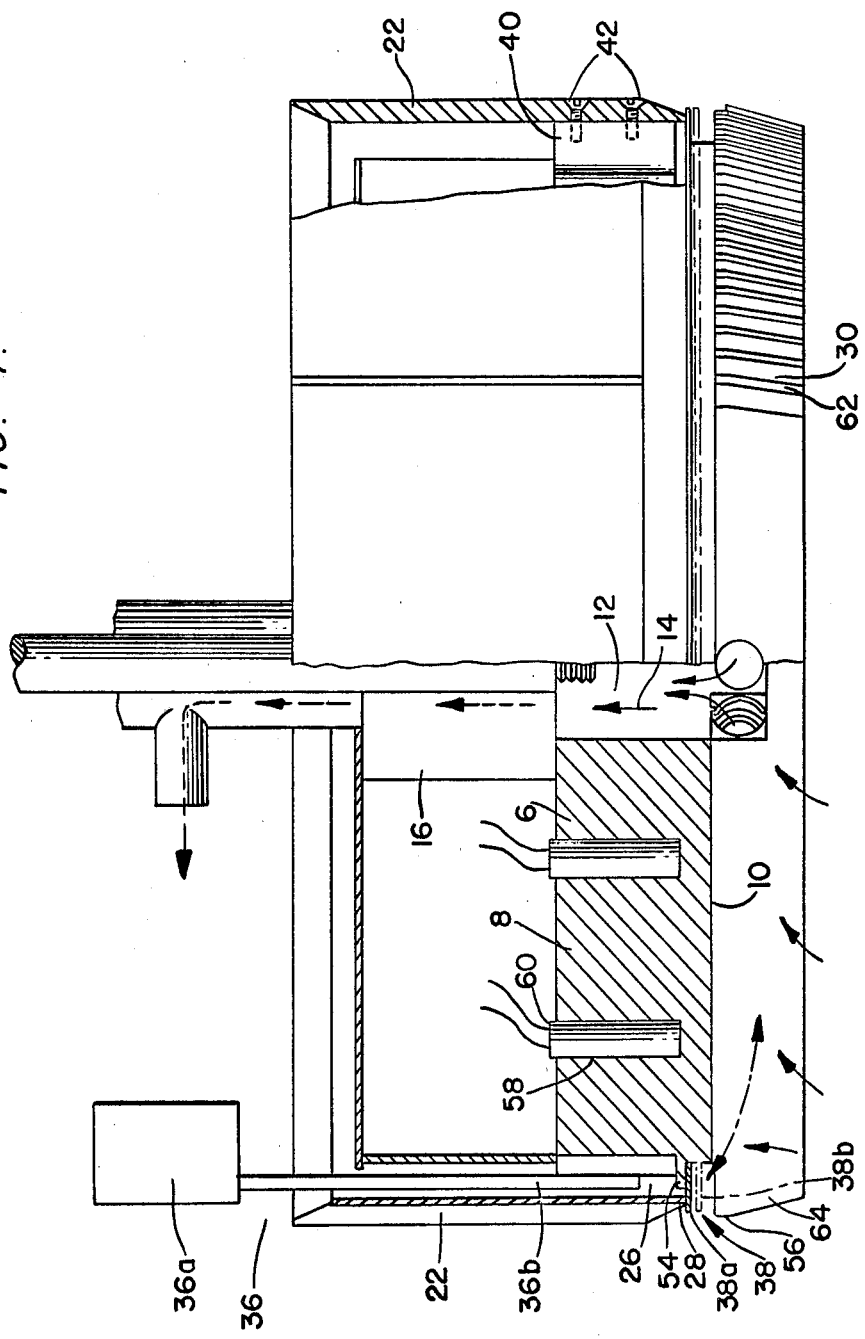

SCRAPER AND SENSOR APPARATUS

BACKGROUND OF THE INVENTION

The invention relates to apparatus for dispensing materials. The viscosity of such materials varies depending upon the specific application, and it is not unusual to find materials which are not particularly viscous and are substantially free flowing. On the other hand in certain applications such materials may be extremely viscous and require the application of considerable heat and/or pressure in order to render such materials dispensable. The present invention is particularly applicable to apparatus for dispensing highly viscous materials although it is also useful with substantially free flowing materials.

In one form of apparatus of the type contemplated by the present invention a plate is caused to reciprocate into and out of the open end of a drum-like container housing the material to be dispensed. In operation, as the plate enters the drum it engages the inside surface of the drum and the material therein. As the plate travels towards the closed base of the drum it causes the material sandwiched or pressured therebetween to be dispensed, as for example, by forcing the material through an opening in the plate. Such dispensing may be facilitated by means of a pump associated with such opening to pump the material therethrough as the plate is lowered into the drum. The dispensing operation may be further facilitated by applying heat to the material within the drum. This may be accomplished by, for example, utilizing a plate which includes a heating element affixed thereto or disposed internal thereof. In some instances the material may be so highly viscous as to require the combination of such heat, pressure and pumping action to adequately dispense the material. An example of a dispensing apparatus which may rely upon heat, pressure and pumping is disclosed in Moore, U.S. Pat. No. 3,982,669.

As the plate is lowered into the drum and engages the material, there is a tendency for the material to flow from the bottom of the plate over the top of the plate at the peripheral surface or edge thereof where the plate is adjacent to the inside surface of the drum. For example, in those instances where the plate is cylindrical and is caused to extend into a cylindrical drum for purposes of dispensing material from within the drum, there is a tendency for the material to flow or leak between the outer periphery of the cylindrical plate and the inside surface of the drum. In order to prevent such leakage and to direct substantially all of the material through the dispensing opening in the plate, sealing means or wipers have been used. For example, the cylindrical plate discussed above may be encircled with one or more resilient sealing means which serve to scrape the inside surface of the drum and also to prevent or reduce leakage at the interface between the inside surface of the drum and the periphery of the plate. However, there are a number of problems associated with the use of such sealing means. For example, although the use of such sealing means is helpful it does not solve the problem in those instances where the dispensing capacity of the apparatus is such that the quantity of material which is subjected to the pressure of the plate and ready for dispensing is greater than the quantity of material which the apparatus is designed to dispense for any given period of time. Put another way, this condition can be generally expressed by stating that even in those instances where such sealing means are used, leakage at the drum/plate interface will occur in those instances where the dispensing capacity of the apparatus is such that the quantity of material which is subjected to the pressure of the plate and ready for dispensing is greater than the quantity of material which the apparatus is designed to dispense for any given period of time. This condition can be generally expressed by stating that even in those instances where such sealing means are used, leakage at the drum/plate interface will occur in those instances where the rate of material preparation for dispensing is greater than the rate of dispensing.

Other problems include those associated with the nature of the synthetic or other resilient materials used in making such sealing means. For example, in those instances in which the container has been denoted or otherwise bent out of shape, there may be a problem inserting the plate into the drum. This results from the fact that the configuration or contour of known prior art plates is fixed with the exception that there may be room for deviation caused by the compression of the constituent material of the sealing means. However, even in those instances where the sealing means can deform under compression to adjust the plate to the contour or configuration of the drum opening or inside surface, for such deformity to occur the seal must engage the drum. Such engagement may cause excessive abrading of the sealing means at those positions where the sealing means engages the bent or deformed drum. It should be noted that even under normal use there is a constant shearing action of the sealing means vis-a-vis the inside surface of the drum as the plate is reciprocated within the drum. Such shearing action causes the sealing means to abrade.

There may also be a deleterious affect upon the sealing means caused by a chemical reaction between the material being dispensed and the material of which the sealing means is made. A further deleterious affect may result from the excessive heat to which the sealing means may be subjected. These problems adversely affect the efficiency of dispensing certain materials from existing equipment and may even limit the kinds of materials which may be dispensed from known prior art dispensing apparatus.

In those instances where the sealing means ruptures during use as a result of abrassion, a chemical reaction, excessive heat, and the like, and the material being dispensed is under pressure, such material may be forced through the ruptured area and present a serious safety hazard as a result of the high temperature of the material, its toxic nature or its forceful exit.

Another disadvantage of the prior art sealing means is that although they serve as wipers and wipe excessive material from the inside surface of a drum as the plate is reciprocated, the synthetic plastic-type material from which known prior art sealing means are made does not adequately transfer heat from a heated plate to adequately soften or melt the material clinging to the inside surface of the drum. Therefore, the effectiveness of the sealing means as a wiper is limited.

A further disadvantage of prior art sealing means is that when the plate is removed from a container, excess material adherring to the sides of the container may be removed and caused to be deposited upon the top of the plate. Depositing such material on the top of the plate is wasteful in that such material is not dispensed.

Accordingly, it is an object of this invention to provide an apparatus for dispensing material which prevents such material from flowing from the bottom and over the top of a plate which reciprocates into and out of the open end of a container housing the material to be dispensed.

Another object of this invention is to provide an apparatus for dispensing material which does not require the use of sealing means with a plate which reciprocates into and out of the open end of a container housing the material to be dispensed.

Still another object of this invention is to provide an apparatus for dispensing material which minimizes waste by directing substantially all of the material through a dispensing opening in a plate which reciprocates into and out of the open end of a container housing the material to be dispensed.

A further object of this invention is to provide an apparatus for dispensing material in which adjustments are automatically made to compensate for those instances where the rate of material preparation for dispensing is greater than the rate of dispensing.

Still a further object of this invention is to provide an apparatus for dispensing material in which engagement of the apparatus scraper member with the container housing the material to be dispensed does not excessively wear or abrade such scraper member.

Yet another object of this invention is to provide an apparatus for dispensing material in which engagement of the apparatus scraper member with the material in the container does not have a deleterious affect upon such scraper member caused by chemical reaction and excessive heat.

Another object of this invention is to provide an apparatus for dispensing material which is safe to use.

Still another object of this invention is to provide an apparatus for dispensing material which includes a scraper member which transfers heat from a heated plate to adequately soften or melt the material clinging to the inside surface of a container so that such material can be readily removed by such scraper.

Still another object of this invention is to provide an apparatus for dispensing material which prevents such material from being deposited upon the top of the apparatus as a plate which receprocates into and out of the open end of a container housing the material to be dispensed is moved out of such container.

SUMMARY OF THE INVENTION

This invention achieves these and other objects by providing an apparatus for dispensing material from a container comprising a plate having a top and bottom surface and having an aperture therethrough. Means are coupled with the plate for causing material to flow through the aperture in a direction extending from bottom surface towards the top surface. Means are coupled to the plate for causing the plate to move vertically relative to a container such that the plate may be caused to move into or out of a container as desired. Means are also provided spaced from and coupled with the plate for engagement with the inside walls of a container to scrape material from the walls as the plate moves vertically relative to a container. The space formed between the scraper means and the plate forms a cavity which communicates with the aperture and which includes a material entering opening. In addition, means are provided which are associated with the cavity for controlling the level of material which might enter the cavity.

BRIEF DESCRIPTION OF THE DRAWINGS

FIG. 4 is a cross-sectional, front, plan view taken along the lines 4—4 of the apparatus as depicted in FIG. 3.

DESCRIPTION OF THE PREFERRED EMBODIMENT

Figure 1:
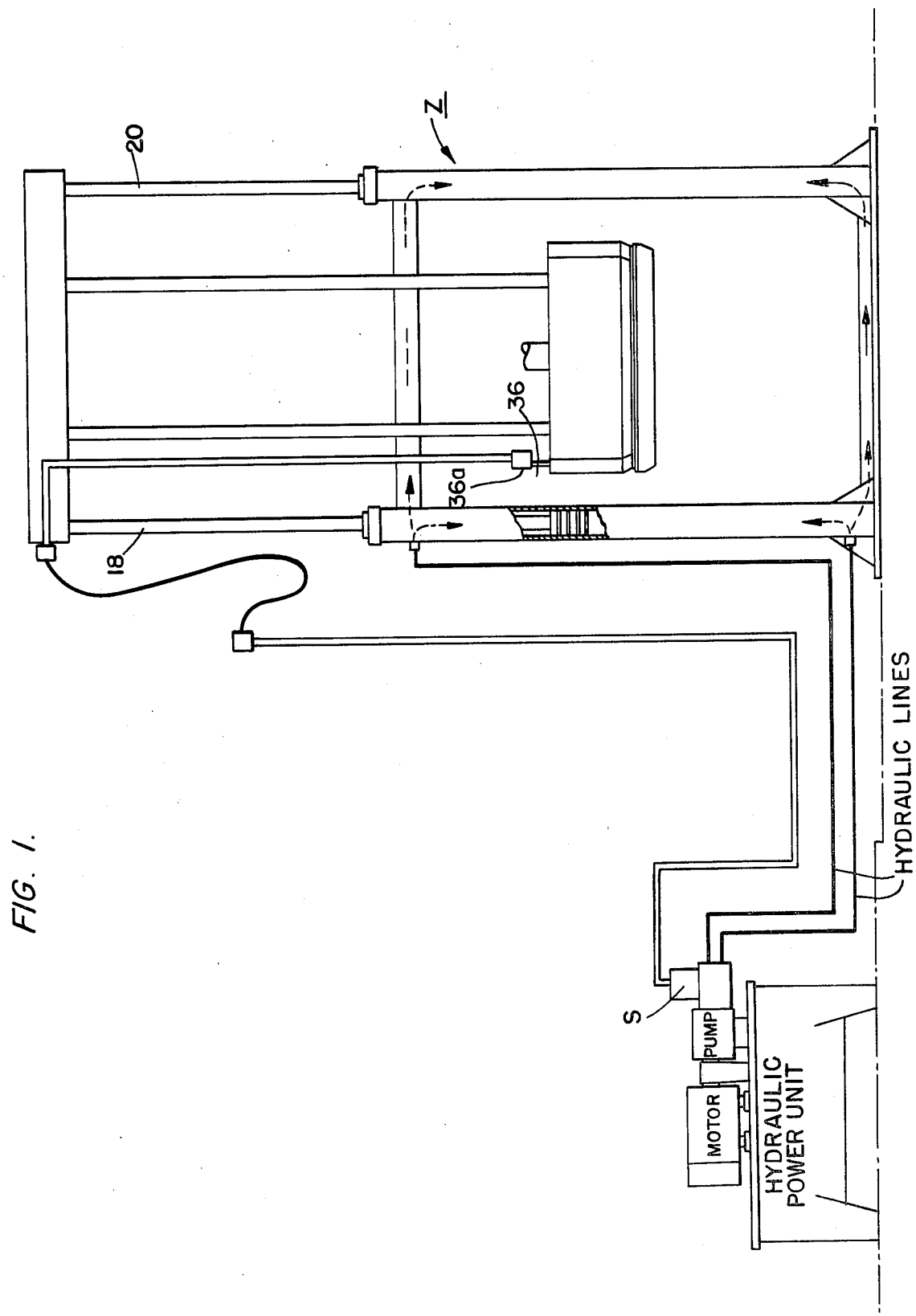
FIG. 1 is a cross-sectional, front, plan view illustrating one embodiment of an apparatus for dispensing material of the present invention.
Figure 2:
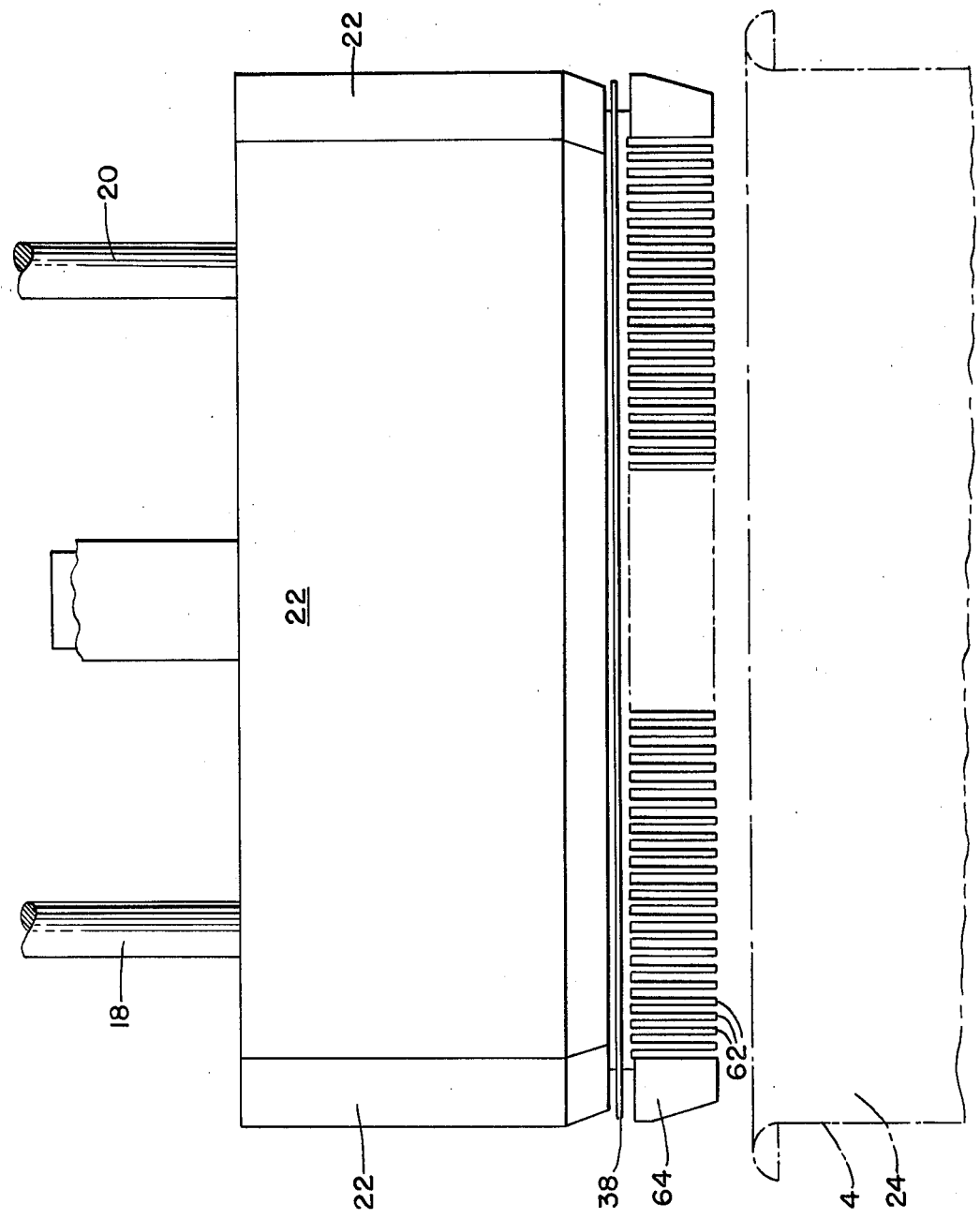
FIG. 2 is a front, plan view illustrating the follower plate and associated apparatus of the embodiment depicted in FIG. 1.

The embodiment of this invention which is depicted in the drawings is one which is particularly suited for achieving the objects of this invention. The drawings depict an apparatus 2 for dispensing material from a container 4 including a plate 6 having a top surface 8 and a bottom surface 10 and having an aperture 12 therethrough. One example of such an apparatus is set forth in the Moore patent referred to and incorporated herein. For example, the apparatus 2 of the present invention may be hot melt dispensing apparatus as disclosed in the Moore patent having a follower plate of the type which is inserted into the container for the purpose of dispensing material therefrom. Means are also provided which are coupled to plate 8 for causing material to flow through aperture 12 in a direction, indicated by arrow 14, extending from bottom surface 10 towards top surface 8. Such means may include a pump 16 coupled with plate 6 which pumps material through aperture 12 in the direction shown by arrow 14. Means are also provided which are coupled with plate 6 for causing the plate to move vertically relative to a container such that the plate may be caused to move into or out of a container as desired. For example, hydraulically or pneumatically operated telescoping rods of the type described in the Moore patent may be used to move the plate 6 accordingly. FIG. 1 depicts rods 18 and 20 for this purpose.

Figure 3:
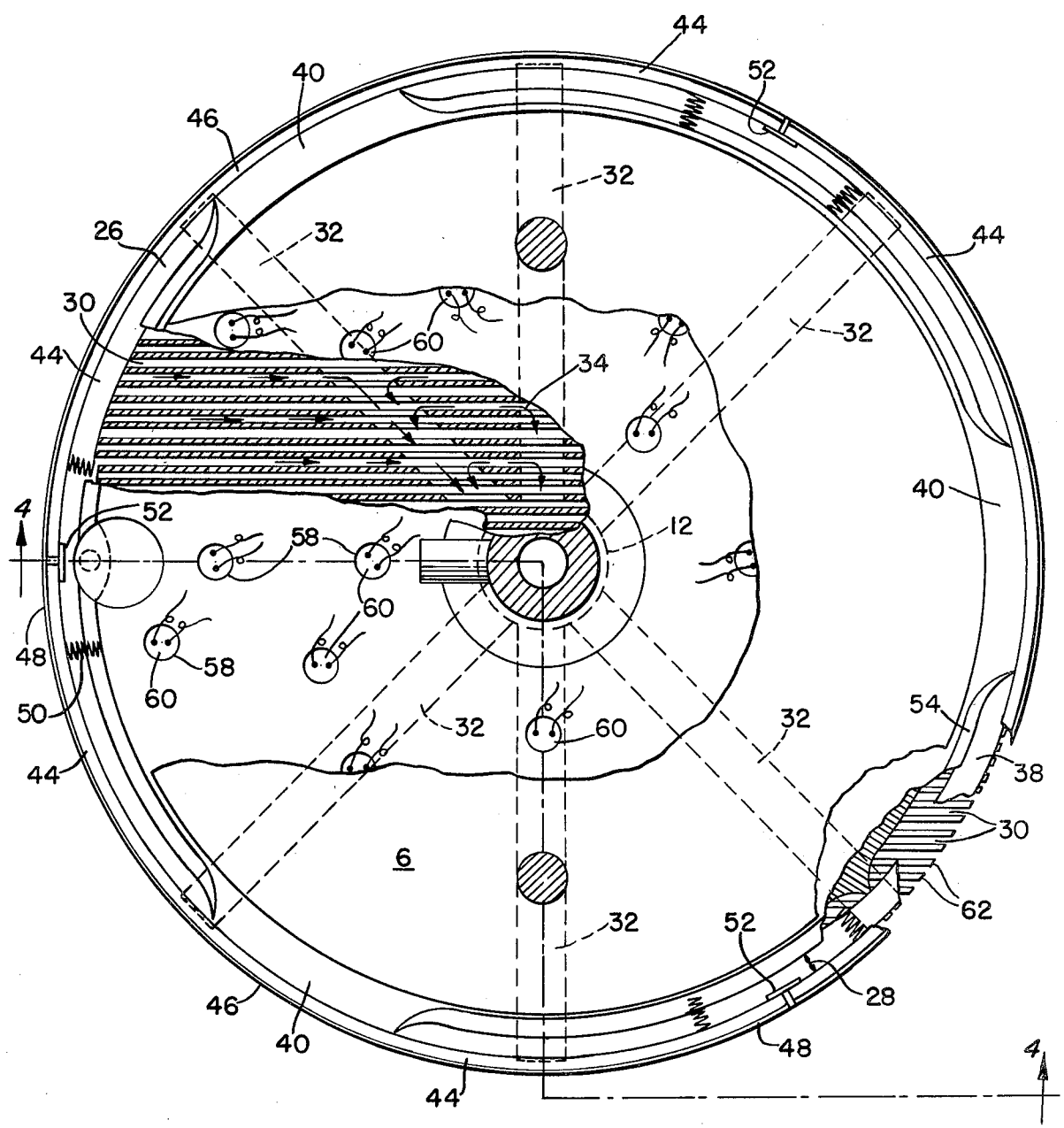
FIG. 3 is a cross-sectional, top, plan view of the apparatus as depicted in FIG. 2.

Also provided are scraper means 22 spaced from and coupled with the plate 6 for engagement with the inside walls 24 of container 4 to scrape material from the walls 24 as the plate moves vertically relative to the container. The space formed between such scraper means 22 and the plate 6 forms a cavity 26 which communicates with aperture 12 and which includes a material entering opening 28. In the extent of the present invention, the term "communicate" means that material may flow from the cavity to the aperture. For example, the material may flow from the cavity back into the drum or container to be subsequently pumped through the aperture. In another embodiment, cavity 26 may communicate with aperture 12 through cut out portions 30 and 32 of the plate 6 as depicted in FIG. 3 by arrows 34 and as discussed below. In order to facilitate heat transfer from the plate 6 to the material adherring to the walls, in those embodiments where plate 6 is heated, scraper member 22 may be manufactured using metal such as aluminum, steel and the like. Scraper members of such materials are also useful in applications where high temperature or chemical reaction would otherwise be a problem.

The dispensing apparatus 2 also comprises means associated with cavity 26 for controlling the level of material which might enter the cavity. For example, such level control means may comprise a sensing member 36 which extends into the cavity 26 as shown in FIG. 4. In one embodiment, the sensing member may be coupled to the plate moving means to control the rate at which the plate 6 moves vertically relative to the container 4. For example, the rate of vertical movement may be increased or decreased, or such movement may be stopped. In the embodiment depicted in FIG. 1, the sensing member 36 is coupled to, and controls the opening and closing of, a solenoid valve. Such opening and closing controls the flow of fluid under pressure to the telescoping rods 18 and 20 to cause such rods to move vertically as desired thereby controlling the movement of the plate 6 towards or away from the material in the container to increase or decrease, respectively, the degree of pressure with which such plate bears against such material. An example of such a sensing member 36 is a capacitance sensing on-off control instrument, generally designated 36a, manufactured by Robertshaw Controls Company of Anaheim, Calif. as Model 304A-B3-B5 mounted on a rod-like probe assembly generally designated 36b manufactured by Robertshaw Controls Company as Model 740-B1-A18. The probe assembly 36b may be mounted vertically with the mid-point on the rod-like probe corresponding to approximately the desired material or liquid level detection point such that the probe may sense the change in material level in cavity 26 as a function of capacitance change between the probe and the cavity wall. In this manner, control action may be provided by means of the control instrument 36a in which a relay contact closure controls the opening and closing of a solenoid valves which controls movement of the telescoping rods as described above. For example, in such a device when the material level exceeds a predetermined maximum level in cavity 26, there is a decrease in capacitance to cause the control relay in control instrument 36a to become de-energized to close said solenoid valve to the extent to reduce or eliminate the fluid pressure which controls the rate of downward vertical movement of the telescoping rods and the plate coupled thereto. When an acceptable level of material is reached such control relay becomes energized to re-open said solenoid valve to increase the fluid pressure which controls the rate of downward vertical movement of the telescoping rods and the plate coupled thereto.

The level control means may comprise a check valve which when in the closed position encloses cavity 26 at opening 28 to prevent communication of cavity 26 with aperture 12. When the check valve is in an open position it opens cavity 26 at opening 28 to allow communication of the cavity 26 with the aperture 12. For example, in the embodiment depicted in FIG. 4, a check valve 38a is depicted in a closed position, the same check valve being shown in an open position in phantom lines at 38b. As depicted in FIG. 4, the check valve 38a may seat upon plate 6 and scraper means 22 to enclose cavity 26 at opening 28 when the check valve is in a closed position.

In the preferred embodiment, plate 6 includes a plurality if intermittently spaced mounting areas 40 positioned about the periphery of plate 6 as depicted in FIG. 3. Scraper member 22 extends about the periphery of plate 6 and is attached thereto at mounting areas 40 by bolts, the scraper member 22 otherwise being spaced from plate 6 to form cavity 26 having a material entering opening adjacent bottom surface 10 which communicates with aperture 12. In the preferred embodiment scraper member 22 is resiliently attached to plate 6. For example, scraper member 22 may comprise a plurality of resilient segments 44 the central portion 46 of each of which is attached to one of the mounting areas 40 and the end portions 48 of each of which are spaced from the plate 6. In this embodiment, spring means 50 are positioned between each of the end portions 48 and the plate 6 for facilitating the resiliency of the scraper member 22. In this embodiment it is also preferred that adjacent end portions 48 be coupled together as depicted with coupling members 52 which are affixed to adjacent end portions 48. Members 52 may comprise a gasket material to impede the flow of material through the interface of adjacent end portions 48.

In one embodiment of the present invention the plate 6 may comprise a first flanged area 54 which extends from and about the periphery of plate 6 adjacent opening 28 and a second flanged area 56 which extends from and about the periphery of plate 6 below the first flanged area 54 and opening 28. The check valve 38 comprises an annular-like member, as depicted in FIG. 3 which moveably extends about the periphery of plate 6 between first flanged area 54 and second flanged area 56. In this embodiment, check valve 38 encloses the cavity 26 at opening 28 when the annular-like member engages the first flanged area to prevent communication of the cavity 26 with the aperture 12. Similarly, the check valve 38 opens cavity 26 at opening 28 when the annular-like member disengages the first flanged area 54 to allow communication of the cavity 26 with the aperture 12. Such annular-like scraper member 38 seats upon the first flanged area 54 and the scraper member 22 to enclose cavity 26 at the opening 28 to prevent communication of cavity 26 with aperture 12 when the check valve 38a is in the closed position as depicted in FIG. 4.

In the embodiment depicted in the drawings the plate 6 includes means for heating the material to be dispensed. For example, plate 6 may include a plurality of apertures 58 into each of which is inserted a cartridge heater 60 for purposes of heating the plate 6 to thereby soften the material to be dispensed. Such a heater-follower plate is known in the art and is described in the Moore patent referred to herein.

Plate 6 may comprise means for heating the material and also includes a plurality of heat radiating fins 62 entending vertically from the bottom surface 10 of the plate 6. In the preferred embodiment depicted in FIG. 4, such fins 62 also entend laterally from plate 6 at 64 to form said second flanged area 56.

In operation, the apparatus 2 of the present invention is positioned in a manner known in the art so that when the apparatus is actuated the telescoping rods 18 and 20 are caused to move vertically downward and thereby lower the plate 6 into a drum-like container 4 housing the material to be dispensed. The dimensions of the plate 6 and scraper member 22 are such that as the plate enters the drum the scraper engages the inside surface of the drum and the fins 62 engage the material therein. Cartridge heaters are energized to heat plate 6, including its fins 62, in a manner known in the art so that as fins 62 engage the material it is heated and melted. As the rods 18 and 20 continue to lower the plate 6 into the drum-like container, the plate 6 causes the material to be sandwiched or pressured between the plate and the closed base of the container. By continuing to lower plate 6 into the container, the melted material is forced through the cut out portions 30 and 32 of the plate 6 and then through the opening 12, as depicted in FIG. 3 by arrows 34, to be dispensed by pump 16 in a manner known in the art.

In those embodiments which do not include a check valve 38, as the plate 6 is lowered into the container and the material is dispensed, excess material will enter cavity 26 through opening 28 in those instances where the rate of material melting or preparation is greater than the rate of dispensing. In order to prevent the melted material from continuing to fill cavity 26 and to eventually overflow upon the top of the apparatus, the sensing member 36 is provided to automatically make adjustments to the apparatus to compensate for the excessive rate of material melting. Such adjustments are made in the following manner. Prior to the operation of the dispensing apparatus 2, the sensing member 36 is adjusted to sense a predetermined level of material in cavity 26 above which level it is desired that the material not proceed. Subsequently, the plate 6 is lowered into the container and as noted the material may begin to enter cavity 26. If the material reaches the predetermined level the probe 36b senses such change in material level and causes a control relay in control instrument 36a to become de-energized to close a solenoid valve to the extent to reduce or eliminate the fluid pressure which controls the rate of downward vertical movement of the telescoping rods and the plate coupled thereto. For example, if it is desired to decrease the rate at which the plate 6 descends into the container until such time as the level of material in cavity 26 is appropriately reduced, then the control relay would become de-energized and completely close the solenoid valve which controls the flow of fluid under pressure to the piston portion of the telescoping rods 18 and 20 to thereby decrease the rate at which such rods and plate coupled thereto descend into the container 4. Although in this manner the sensing member 36 decreases the rate of downward movement of the plate 6, it does not affect the operation of pump 16. Accordingly, pump 16 continues to pump the excess material from cavity 26 through opening 28, the material being forced through cut out portions 30 and 32 of the plate 6 and then through the opening 12 to be dispensed by the pump in a manner known in the art. When the material in cavity 26 is below the predetermined level, the control relay is automatically energized to re-open said solenoid valve which controls the flow of fluid under pressure to the piston portion of the telescoping rods 18 and 20 to thereby increase the rate at which such rods and plate coupled thereto descend into the container 4.

In those embodiments which include a check valve 38, as the plate 6 is lowered into the container and the material is dispensed, entrance of excess material into cavity 26 is retarded by the check valve. However, since check valve 38 does not provide a perfect seal at opening 28, excess material will penetrate cavity 26. When the material reaches the predetermined level above which it is desired that the material not proceed, the rate of movement of the plate 6 may be reduced as described. When movement of plate 6 is so reduced, the check valve 38 will fall from its sealing relationship at opening 28 to rest upon the lower or second flanged area 56 which in the drawings is formed by the top surface of the fins 62. In this manner complete access to cavity 26 is available through opening 28 and the excess material is pumped from the cavity as described above. When the rate of lowering of the plate 6 is subsequently caused to increase as described above the pressure of the material upon the check valve 38 causes it to rise and close or seal opening 28 as the check valve 38 is seated upon the bottom surface of scraper member 22 and the upper or first flanged area 54.

In the preferred embodiment it is desired that the pressure which the plate 6 exerts upon the material to be dispensed from the container 4 not be eliminated. The concern is that if such pressure is eliminated, as soon as the excess material is pumped from cavity 26 the pump will begin to pump air immediately prior to when the plate 6 is caused to move further downward into the container 4. To prevent the pumping of air, in the preferred embodiment when the control relay is de-energized the solenoid valve is only closed to the extent to reduce the rate of descent of the plate 6, as discussed above, until such time as the excess material is cleared from cavity 26. When the control relay is subsequently energized, the valve is re-opened and the telescoping rods continue downward at the original rate of descent. Alternatively, if the weight of the plate 6 is adequate, when the control relay is de-energized the solenoid valve may be completely closed to eliminate the fluid pressure bearing upon the piston portion of the telescoping rods 18 and 20 to allow the plate 6 and rods 18 and 20 to continue to move downward under their own weight. In such a structure, the plate 6 will continue to bear upon the material in container 4 and to move downward into the container under its own weight until positive downward movement of the telescoping rods begin when the control relay is again energized.

Regardless of which embodiment is used, when the apparatus 2 of the present invention is removed from container 4, scraper 22 removes material which may be adherring to the inside walls of container 4 from such walls. As the material is so removed during the raising of the plate 6 relative to container 4, such material flows back into container 4 through cavity 26.

Cavity 26 also provides an opening through which air being compressed between plate 6 and the material being dispensed may be released. Such a release, in addition to the controlled rate of descent of plate 6, provides the dispensing apparatus of the present invention with means to prevent the material being dispensed from splashing or spurting under pressure. This feature is particularly desirable when such material is heated or toxic.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. Apparatus for dispensing material from a container comprising:
   a plate having a top surface and a bottom surface and having an aperture therethrough;
   means coupled with said plate for causing said material to flow through said aperture in a direction extending from said bottom surface towards said top surface;
   means coupled with said plate for causing said plate to move vertically relative to a container such that said plate may be caused to move into or out of a container as desired;
   means spaced from and coupled with said plate for engagement with the inside walls of a container to scrape material from said walls as said plate moves vertically relative to a container, said space formed between said scraper means and said plate forming a cavity which communicates with said aperture and which includes a material entering opening; and, means associated with said cavity for controlling the level of said material which might enter said cavity.

2. Apparatus as described in claim 1 wherein said scraper means is resiliently attached to said plate.

3. Apparatus as described in claim 2 wherein said level control means includes a sensing member which extends into said cavity.

4. Apparatus as described in claim 3 wherein said sensing member is coupled to said plate moving means to control the rate at which said plate moves vertically relative to said container.

5. Apparatus as described in claim 4 wherein said level control means further includes a check valve which when in a closed position encloses said cavity at said opening to prevent communication of said cavity with said aperture and which when in an open position opens said cavity at said opening to allow communication of said cavity with said aperture.

6. Apparatus as described in claim 5 wherein said check valve seats upon said plate and said scraper means to enclose said cavity at said opening when said check valve is in a closed position.

7. Apparatus as described in claim 2 wherein said level control means includes a check valve which when in a closed position encloses said cavity at said opening to prevent communication of said cavity with said aperture and when in an open position opens said cavity at said opening to allow communication of said cavity with said aperture.

8. Apparatus as described in claim 7 wherein said check valve seats upon said plate and said scraper means to enclose said cavity at said opening when said check valve is in a closed position.

9. Apparatus as described in claim 8 wherein said level control means further includes a sensing member which extends into said cavity.

10. Apparatus for dispensing material from a container comprising:
a plate having a top surface and a bottom surface and having an aperture therethrough, said plate including a plurality of intermittently spaced mounting areas positioned about the periphery of said plate;
a pump coupled with said plate for causing said material to flow through said aperture;
means coupled with said plate for causing said plate to move vertically relative to a container such that said plate may be caused to move into or out of a container as desired;
a scraper member extending about the periphery of said plate and being attached thereto at said mounting areas, said scraper member otherwise being spaced from said plate to form a cavity having a material entering opening adjacent said bottom surface which communicates with said aperture; and,
means associated with said cavity for controlling the level of said material which might enter said cavity.

11. Apparatus as described in claim 10 wherein said scraper member comprises a plurality of resilient segments the central portion of each of which is attached to one of said mounting areas and the end portions of each of which is spaced from said plate, and including spring means positioned between each of said end portions and said plate for facilitating the resiliency of said scraper member.

12. Apparatus as described in claim 11 wherein adjacent end portions of said scraper member are coupled together.

13. Apparatus as described in claim 11 wherein said level control means includes a sensing member which extends into said cavity.

14. Apparatus as described in claim 13 wherein said sensing member is coupled to said plate moving means to control the rate at which said plate moves vertically relative to said container.

15. Apparatus as described in claim 14 wherein said plate comprises a first flanged area which extends from and about the periphery of said plate adjacent said opening and a second flanged area which extends from and about the periphery of said plate below said first flanged area and said opening and wherein said level control means further includes a check valve, said check valve comprising an annular-like member, said annular-like member moveably extending about the periphery of said plate between said first and second flanged areas said check valve enclosing said cavity at said opening when said annular-like member engages said first flanged area to prevent communication of said cavity with said aperture and opening said cavity at said opening when said annular-like member disengages said first flanged area to allow communication of said cavity with said aperture.

16. Apparatus as described in claim 15 wherein said annular-like member seats upon said first flanged area and said scraper member to enclose said cavity at said opening to prevent communication of said cavity with said aperture when said check valve is in a closed position.

17. Apparatus as described in claim 11 wherein said plate comprises a first flanged area which extends from and about the periphery of said plate adjacent said opening and a second flanged area which extends from and about the periphery of said plate below said first flanged area and said opening, and wherein said level control means further includes a check valve, said check valve comprising an annular-like member, said annular-like member moveably extending about the periphery of said plate between said first and second flanged areas, said check valve enclosing said cavity at said opening when said annular-like member engages said first flanged area to prevent communication of said cavity with said aperture and opening said cavity at said opening when said annular-like member disengages said first flanged area to allow communication of said cavity with said aperture.

18. Apparatus as described in claim 17 wherein said annular-like member seats upon said first flanged area and said scraper member to enclose said cavity at said opening to prevent communication of said cavity with said aperture.

19. Apparatus as described in claim 18 wherein said level control means further includes a sensing member which extends into said cavity.

20. Apparatus of claim 11, 14, 16, or 18 wherein said plate comprises means for heating said material and includes a plurality of heat radiating fins extending vertically from said bottom surface of said plate.

21. Apparatus of claim 15, 16, 17 or 18 wherein said plate comprises means for heating said material and includes a plurality of heat radiating fins extending vertically from said bottom surface of said plate, and extending laterally from said plate to form said second flanged area.

22. Apparatus of claim 1, 2, 3, 4, 5, 6, 7, 8, 9, 10, 12, 13 or 19 wherein said plate comprises means for heating said material.

* * * * *